United States Patent [19]

Brotzmann et al.

[11] Patent Number: 4,861,368

[45] Date of Patent: Aug. 29, 1989

[54] METHOD FOR PRODUCING IRON

[75] Inventors: Karl Brotzmann, Sulzbach-Rosenberg; Jonathan P. Moodie, Amberg, both of Fed. Rep. of Germany; Richard E. Turner, deceased, late of Applecross, Australia, Trenna R. Turner, executor

[73] Assignee: Kloeckner CRA Technologie GmbH, Duisburg, Fed. Rep. of Germany

[21] Appl. No.: 23,367

[22] Filed: Mar. 9, 1987

[30] Foreign Application Priority Data

Mar. 8, 1986 [DE] Fed. Rep. of Germany ....... 3607776

[51] Int. Cl.$^4$ ............................................. C21B 11/00
[52] U.S. Cl. .......................................... 75/25; 75/26; 75/38; 75/40; 266/148
[58] Field of Search ................... 75/40, 25, 26, 38; 266/148, 157

[56] References Cited

U.S. PATENT DOCUMENTS 2,865,734 12/1958 Klemantski .............................. 75/40
4,605,437 8/1986 Sugiura et al. ....................... 266/144

Primary Examiner—Melvyn J. Andrews
Attorney, Agent, or Firm—Armstrong, Nikaido, Marmelstein, Kubovcik & Murray

[57] ABSTRACT

A method for producing iron in an elongated reaction vessel provided with underbath nozzles and top blowing means in which carbonaceous fuels, iron ore and/or prereduced ore are fed to the melt and in which the reaction gases escaping from the melt are afterburned with oxygen-containing gases in one or more stages, the waste gas aperture of the reaction vessel being offset from the reaction zone of the cabonaceous fuels and thus disposed outside the eruption and splashing area, and the waste gas temperature in the waste gas conduit connected to the waste gas aperture being held above the soldifying temperature of the droplets carried along in the waste gas stream, and the waste gas then being cooled to less than 1000° C. in an adjoining chamber.

8 Claims, 1 Drawing Sheet

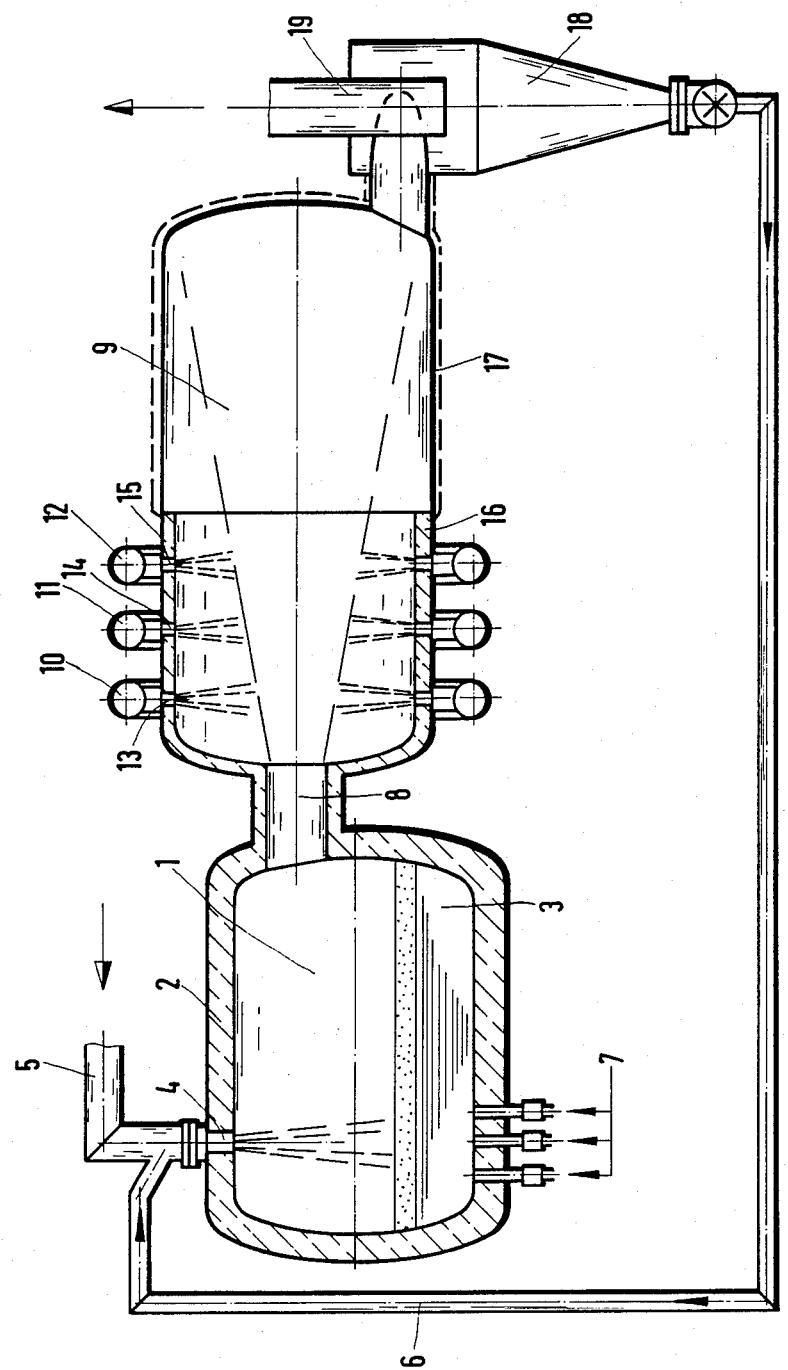

METHOD FOR PRODUCING IRON

FIELD OF THE INVENTION

The present invention relates to a method for producing iron in an elongated reaction vessel provided with underbath nozzles and top blowing means, in which carbonaceous fuels, iron ore and/or prereduced ore are fed to the melt and the reaction gases escaping from the melt, chiefly CO and $H_2$, are afterburned with oxygen-containing gases in one or more stages.

BACKGROUND OF THE INVENTION

A known method of producing iron is described in German "offenlegungsschrift" No. 31 33 575. Carbonaceous and/or hydrocarbonaceous fuels are gasified in an iron bath reactor, producing not only gas, but also liquid iron from substances which contain iron at least partly in an oxidic form. The energy released during the coal combustion in the iron bath is increased in this method by afterburning the gaseous reaction products in the gas chamber of the iron bath reactor with free jets of oxygen-containing media directed onto the bath surface and by transferring the heat thus generated back to the melt. It has become apparent during the application of this known method that the strong development of gas in the iron melt causes liquid iron to be discharged from the reaction vessel. A bottom blown 60 t steel-making converter of the conventional type was operated by the method according to the above-mentioned patent application, with liquid iron obtained from coal and iron ore. When performing the method the reaction materials coal and ore and part of the total amount of oxygen were fed to the iron bath via nozzles having a protective medium sheathing and located in the converter bottom. In the gas chamber of the converter the reaction gases escaping from the iron bath were afterburned by oxygen from nozzles above the bath surface, and a degree of afterburning of approximately 30% could be obtained. In order to produce 1 t of liquid iron from iron ore, it was necessary to feed approximately 1 t of coal to the melt. The method takes place basically as described in the abovementioned patent application, but a considerable amount of iron was lost due to splashes which were hurled directly out of the converter, on the one hand, and entrained in and carried along by the waste gas stream, on the other hand, so that the overall process was no longer economical.

SUMMARY OF THE INVENTION

The present invention is based on the problem of providing a method for producing iron from carbonaceous fuels and iron ore that avoids the iron losses.

This problem is solved according to the invention by offsetting the waste gas port of the reaction vessel from the reaction zone of the carbonaceous fuels and thus disposing the port outside the melt eruption and splashing zone, holding the waste gas temperature in the hot gas conduit connected to the waste gas port above the solidifying temperature of the iron droplets carried along in the waste gas stream and then cooling the waste gas to less than 1000° C. in an adjoining chamber.

DETAILED DESCRIPTION OF THE INVENTION

According to the invention, the first step in solving the problem posed consists in using an elongated reaction vessel, for example, a drum type converter, in which the waste gas port is offset from the reaction zone of the carbonaceous fuels and thus disposed outside the eruption and splashing zone of the melt, so that above this reaction zone there are not ports with a large diameter through which metal splashes are directly hurled out of the vessel.

Surprisingly enough, however, it has been shown that even in such a reaction vessel the waste gas carries along a large amount of entrained fine iron droplets with a droplet size up to approximately 0.1 mm. The amount is approximately 100 to 200 kg/t of injected coal, and the identifiable droplets usually have a diameter of 0.01 to 0.1 mm. These droplets carried along by the waste gas stream settle in the waste gas conduit and lead to clogging there after a relatively short time of operation. For example, considerable deposits and even clogging were readily ascertained in the waste gas conduit of 10 t converter after an operating time of one to ten hours with coal throughputs of 3 to 30 t.

According to the invention these deposits can be avoided in the waste gas conduit by holding the waste gas temperature in the hot gas conduit conected to the waste gas port above the solidifying temperature of the iron droplets carried along in the waste gas stream. This hot area of the waste gas conduit opens into a large chamber in which the waste gases are then cooled to less than 1000° C. to cause the iron droplets to solidify.

According to the invention this gas cooling chamber can basically be designed as one chooses. However, it preferably has an approximately cylindrical shape, with the diameter of the cylinder being many times greater than the diameter of the hot gas conduit. The gas cooling chamber either has water-cooled walls or is lined with refractory material. A combination of these two possibilities has also proved useful. The gas cooling chamber is preferably so long that the freely flowing-in waste gas stream undergoes a temperature reduction to less than 1000° C. due to the residence time in the gas cooling chamber, so that the iron droplets solidify prior to contact with the surface of the chamber.

A further particularly advantageous embodiment of the invention is to mix the waste gases with cold gases, liquids and/or powdery substances when they leave the waste gas conduit or immediately thereafter, in order to lower the temperature of the waste gas stream to a value below the stated maximum temperature of 1000° C. Powdery substances also have the advantage that the iron droplets carried along by the waste gas settle on these substances. Powdery substances that can be used are, for example, ground ores, lime, limestone, raw magnesite, coal, and coke, singly or in any desired mixtures.

According to the invention an additional reaction can take place between the above-mentioned powdery substances and the waste gas itself. For example, limestone can be deacidified, ore partly reduced or coal coked. It may be necessary for these reactions to occur to heat the solidgas mixtures at a certain time and hold them at the reaction temperature. Accordingly, it may be expedient to use substances that are as fine-grained as possible. For example, grain sizes of less than 0.1 mm have proved useful in the case of iron ore in order to reduce the ore particles to the wustite stage in a total residence time of less than 1 second.

An advantageous embodiment of the invention consists in designing the waste gas-conducting connection between the reaction vessel and the gas cooling chamber as a straight hot gas conduit. A straight conduit has an advantageous effect in avoiding deposits. It has been shown that a deflection of the hot waste gas stream leads to metal droplets precipitating chiefly at the point of deflection, particularly when a high degree of afterburning of approximately 30 to 50% is achieved in the reaction vessel and the iron-containing droplets are present in the waste gases in a partially oxidized form. These oxidized particles lead to reactions with the refractory lining of the waste gas conduit and result in quite firmly clinging deposits. This hot part of the waste gas conduit should preferably be kept as short as possible, for example only as long as a necessary leadthrough with the corresponding flange connections. Economical advantages are also obtained if preheated air is used as the oxygen-containing gas in the intive method. If preheated air of 1000° to 1200° C., i.e. a hot air blast, is blown onto the bath surface in such a way that the reaction gases are sucked in the gas chamber of the reaction vessel, afterburned and the energy thereby released transferred to a large extent to the melt, approximately 40 to 50% of the energy obtainable from the oxidation of coal to $CO_2$ and $H_2O$ can be utilized in the process. For example, 700 kg of coal suffice to produce 1 t of liquid iron on this basis. The amount of gas that arises at the same time suffices to adjust an average temperature of the solid-gas mixture of approximately 1050° C. in the case of a mixture with cold fine ore. For troublefree operation in which no deposites occur in the waste gas conduits, a further temperature reduction of the waste gases to approximately 900° C. should be aimed at. This can be effected according to the invention by adding part of the total amount of coal to the ore, or part of the waste gas can be recycled cold and used to reduce the temperature of the solidgas mixture further to the temperature of approximately 800° to 900° C., which is optimal for the ore reduction.

The hot air jet introduced into the reaction vessel will normally have a temperature of 800° to 1500° C., and preferably 1000° to 1300° C., and a velocity of 100 to 300 meters per second, preferably 150 to 250 meters per second. Coal or other carbonaceous or other hydrocarbonaceous fuel is blowing into the bottom of the vessel, below the melt surface, in an amount of about 500 to 800 kg, preferably 600 to 700 kg, per ton of iron produced. The coal is generally blown in at a velocity of approximately 50 meters per second. The waste gases will normally have a temperature of 1500° to 2000° C., and preferably 1600° to 1700° C.

In the gas cooling chamber, the gas is normally cooled down to about 600° to 1100° C., and preferably 800° to 900° C., before the gas stream touches the opposite wall of the cooling vessel. In one embodiment, the cooling can be at least in part accomplished by the addition of powdery materials, such as finely ground iron ore, which can be introduced at the rate of 1500 to 1800 kg, preferably approximately 1600 kg, per ton if iron produced. Lime or limestone powder may be introduced into the waste gas stream, in order to cool the gas stream, in an amount of from 80 to 500 kg, preferably 200 to 300 kg, per ton of iron produced. Finally, coal or other carbonaceous or hydrocarbonaceous substance may be blown into the gas cooling chamber, in any amount of from 100 to 1000 kg, preferably 400 to 600 kg, per ton of iron produced. While only one powdery cooling substance may be utilized, it is preferred to utilize a combination of, in order, iron ore, lime or limestone and coal or other powdery fuel, so as to accomplish some desired chemical reactions in the waste gas stream.

The solids in the waste gas stream exiting the cooling tank may be separated from the waste gases at any convenient temperature, and then the solids are preferably recycled to the reaction, with the solids preferably being introduced into the reaction vessel with the jet of oxygen-containing gas, such as a hot air blast.

DESCRIPTION OF THE DRAWING AND WORKING EXAMPLE

The invention is described in more detail in the following with reference to the drawing and a non-restrictive example.

FIG. 1 shows a longitudinal cross-section of a reaction vessel with a gas cooling chamber connected thereto.

A drum-shaped reaction vessel 1 with new lining 2 and a clear volume of 150 m$^3$ contains 50 to 120 t of iron melt 3 with a carbon content of approximately 2.5% and at a temperature of 1550° C. A hot air blast with a temperature of 1200° C. supplied through hot gas conduit 5 is blown through tuyeres 4 at a blowing rate of 2000 Nm$^3$/min into the bath surface. A mixture of coke, lime and fine ore reduced to wustite is added to the hot blast directly before it enters tuyere 4. The mixture has a temperature of 800° C. and reaches hot blast conduit 5 via conduit 6. The feed rates of the individual components of this mixture are 1350 kg/min for the partly reduced ore, 400 kg/min for coke and 90 kg/min for lime. Through bottom nozzles 7 with a clear diameter of 18 mm, 200 kg/min of gas-flame coal is blown into the metal bath, so that sufficient bath agitation is obtained.

In this way, approximately 1 t of liquid iron is produced per minute. The waste gas with a temperature of approximately 1680° C. is conducted on the shortest path through hot gas conduit 8 into gas cooling chamber 9. In this chamber 9 the waste gas is cooled down to approximately 800° to 900° C. by the addition of powdery materials, before the gas stream touches the opposite wall of the chamber, to solidify the iron and/or iron oxide droplets entrained in the waste gas.

Through feed conduit 10 feed ports 13 are supplied with fine ore. The fine ore is blown in at a rate of 1600 kg/min into gas cooling tank 9, where it is heated and reduced to FeO. Approximately 1 meter downstream approximately 200 kg/min of limestone powder is blown in through feed port 14 and supply conduit 11 associated therewith. In the hot waste gas stream deacidification takes place, i.e. the supplied limestone is split onto CaO and $CO_2$. Finally, gas-flame coal is blown in to gas cooling chamber 9 approximately 1 meter downstream of feed port 14 through feed port 15, which communicate with supply conduit 12, at a rate of 520 kg/min, and cokes in the hot waste gas stream.

Gas cooling tank 9 has a refractory lining 16 in the area of the feed ports for the powdery substances, and adjacent thereto the wall is water-cooled in the area which can be hit by the waste gas stream.

The mixture of waste gas, dust and the reacted powdery substances collects in hot cyclone 18, from where the mixture of coke, FeO and CaO to be fed to the reaction vessel is transported via supply conduit 6 to the hot gas conduit 5. The cleaned waste gas leaves hot cyclone 18 via conduit 19, and part of the waste gas serves to produce the hot air blast. The remainder of approximately 1900 Nm$^3$/min with a caloric value of 840 kcal/Nm$^3$ is available for external applications.

We claim:

1. A method for producing iron in an apparatus including an elongated reaction vessel having a top and a bottom, containing a melt and provided with nozzles under the melt surface, and with means for blowing substances into the vessel from the top thereof, said method comprising feeding carbonaceous fuels and iron ore and/or prereduced iron ore to the melt, with the carbonaceous fuel introduced into the melt in a reaction zone to produce reaction gases escaping from the melt, and afterburning the reaction gases with oxygen-containing gases in at least one stage to produce afterburned reaction gases, with the afterburned reaction gases discharged from the vessel through a discharge port, wherein the afterburned reaction gases have iron droplets entrained therein, the improvement comprising reducing the carryover of entrained droplets in the afterburned reaction gases by passing the afterburned waste gases from the reaction zone to a second area of the reaction vessel different from the reaction zone and then through the discharge port, wherein the discharge port is in an area of the reaction vessel removed from any area of the reaction vessel wherein the melt is prone to eruption and splashing, and through a waste gas conduit to a gas cooling chamber, while maintaining the temperature of the waste gas in the discharge port and the waste gas conduit above the solidifying temperature of iron droplets which may be entrained in the waste gas stream, and cooling the waste gas to a temperature of less than 1,000° C. in the gas cooling chamber.

2. Method of claim 1, wherein the afterburned waste gases are passed from the discharge port of the reaction vessel directly through the waste gas conduit to the gas cooling chamber.

3. Method of claim 1, wherein the waste gases entering the gas cooling chamber immediately after leaving the waste gas conduit are mixed with at least one cold member selected from the group consisting of gases, liquids, powdery substances, and mixtures thereof, to reduce the gas temperature to less than 1000° C. before the entrained iron droplets in the waste gases contact a surface of the gas cooling chamber.

4. Method of claim 3, wherein powdery substances are blown into the waste gas stream to solidify thereon any entrained iron droplets in the waste gas stream.

5. Method of claim 4, wherein the powdery substances are selected from the group consisting of powdered iron ore, lime, limestone, raw magnesite, coal, coke, and mixtures thereof.

6. Method of claim 4, wherein the powdery substances which are blown into the waste gas stream react with the gas.

7. Method of claim 6, wherein ground iron ore having a grain size less than 0.1 mm is blown into the waste gas stream and reduced to the wustite stage.

8. A method for producing iron in an elongated reaction vessel having a top and a bottom, containing a melt, and provided with nozzles under the melt surface and blowing means for blowing substances into the vessel from the top thereof, said vessel including a reaction zone in the vicinity of the nozzles, and a discharge port offset from the reaction zone so that the discharge port is outside any area of the vessel wherein the melt is prone to eruption and splashing, said apparatus also including a waste gas conduit connected to the discharge port and in communication with a gas cooling chamber, said method comprising feeding iron ore and/or prereduced iron ore to the melt in the bottom of the vessel, feeding carbonaceous fuels through the said nozzles into the melt in the reaction zone to produce reaction gases escaping from the melt, and afterburning the reaction gases escaping from the melt with oxygen-containing gases, wherein the afterburned waste gases have iron droplets entrained therein, discharging the afterburned reaction gases from the vessel through the discharge port and passing the waste gases discharged through the waste gas conduit to the gas cooling chamber, while maintaining the temperature of the waste gas in the discharge port and the waste gas conduit above the solidification temperature of the iron droplets entrained in the waste gas stream, and cooling the waste gas to a temperature of less than 1000° C. in the gas cooling chamber.

* * * * *